(12) United States Patent
Matsuno et al.

(10) Patent No.: US 9,764,640 B2
(45) Date of Patent: Sep. 19, 2017

(54) TRAVEL CONTROL APPARATUS FOR VEHICLE

(71) Applicant: SUBARU CORPORATION, Tokyo (JP)

(72) Inventors: Koji Matsuno, Tokyo (JP); Hajime Oyama, Tokyo (JP); Yasushi Takaso, Tokyo (JP); Masato Mizoguchi, Tokyo (JP); Harunobu Horiguchi, Tokyo (JP); Takayuki Nagase, Tokyo (JP); Eiichi Shiraishi, Tokyo (JP); Shiro Ezoe, Tokyo (JP); Satoru Akiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 14/928,943

(22) Filed: Oct. 30, 2015

(65) Prior Publication Data

US 2016/0121906 A1    May 5, 2016

(30) Foreign Application Priority Data

Oct. 31, 2014 (JP) .................. 2014-222493

(51) Int. Cl.
 *B60K 28/10* (2006.01)
 *G05D 1/00* (2006.01)
 (Continued)

(52) U.S. Cl.
 CPC ............... *B60K 28/10* (2013.01); *B62D 6/00* (2013.01); *G05D 1/0061* (2013.01);
 (Continued)

(58) Field of Classification Search
 CPC .. G05D 1/0061; G05D 1/0088; G05D 1/0214; B62D 6/00; B60K 28/10; B60W 2050/0215
 See application file for complete search history.

(56) References Cited

U.S. PATENT DOCUMENTS 6,151,539 A * 11/2000 Bergholz .............. G01S 13/931
 340/435
9,221,396 B1 * 12/2015 Zhu ........................ B60Q 9/008
 (Continued)

FOREIGN PATENT DOCUMENTS

JP    H07-108853 A    4/1995
JP    2003-063373 A   3/2003
 (Continued)

OTHER PUBLICATIONS

Decision to Grant issued in corresponding Japanese Patent Application No. 2014-222493, dated Sep. 13, 2016.
 (Continued)

*Primary Examiner* — Thomas G Black
*Assistant Examiner* — Sze-Hon Kong
(74) *Attorney, Agent, or Firm* — McDermott Will & Emery LLP

(57) ABSTRACT

In a travel control apparatus for a vehicle, a travel environment information acquisition unit acquires travel environment information, and a travel information detector detects travel information relating to the vehicle. The apparatus executes automatic driving control based on such information pieces. A vehicle peripheral object detector detects an object around the vehicle, separately to the travel environment information acquisition unit. An environment information acquisition failure detector detects an acquisition failure in the travel environment information acquisition unit. Upon an acquisition failure of the travel environment information, an evacuation controller executes evacuation
 (Continued)

control by evacuating the vehicle to the roadside through automatic driving based on the travel environment information detected most recently before the acquisition failure and the travel information, and activates the vehicle peripheral object detector and, when an object is detected on the periphery around the vehicle, executes the evacuation control.

15 Claims, 7 Drawing Sheets

(51) Int. Cl.
  *G05D 1/02* (2006.01)
  *B62D 6/00* (2006.01)
  *B60W 50/02* (2012.01)
(52) U.S. Cl.
  CPC ......... *G05D 1/0088* (2013.01); *G05D 1/0214* (2013.01); *B60W 2050/0215* (2013.01)

(56) References Cited

U.S. PATENT DOCUMENTS

| | | | | |
|---|---|---|---|---|
| 9,523,984 | B1* | 12/2016 | Herbach | B62D 6/00 |
| 2006/0106533 | A1* | 5/2006 | Hirokawa | G01C 21/165 |
| | | | | 701/472 |
| 2006/0249323 | A1* | 11/2006 | Kurata | B60C 23/0493 |
| | | | | 180/233 |
| 2007/0219720 | A1* | 9/2007 | Trepagnier | B60W 30/00 |
| | | | | 701/300 |
| 2008/0039991 | A1* | 2/2008 | May | G05D 1/024 |
| | | | | 701/25 |
| 2011/0054791 | A1* | 3/2011 | Surampudi | G01C 21/005 |
| | | | | 701/472 |
| 2011/0241862 | A1* | 10/2011 | Debouk | B60W 50/035 |
| | | | | 340/439 |
| 2015/0266489 | A1* | 9/2015 | Solyom | B60W 50/029 |
| | | | | 701/23 |
| 2015/0266490 | A1* | 9/2015 | Coelingh | B60W 50/082 |
| | | | | 701/30.5 |
| 2015/0331422 | A1* | 11/2015 | Hartung | G05D 1/021 |
| | | | | 701/23 |
| 2016/0129917 | A1* | 5/2016 | Gariepy | G05D 1/0011 |
| | | | | 701/2 |
| 2016/0132705 | A1* | 5/2016 | Kovarik | G06K 7/10376 |
| | | | | 340/10.3 |
| 2016/0282874 | A1* | 9/2016 | Kurata | G05D 1/0088 |

FOREIGN PATENT DOCUMENTS

| | | |
|---|---|---|
| JP | 2011-162132 A | 8/2011 |
| JP | 2015-123899 A | 7/2015 |
| JP | 2016-038689 A | 3/2016 |

OTHER PUBLICATIONS

Notification of Reasons for Refusal issued in corresponding Japanese Patent Application No. 2014-222493, dated May 31, 2016.

* cited by examiner

BRANCHING

MERGING

EVACIATION

TRAVEL CONTROL APPARATUS FOR VEHICLE

CROSS-REFERENCE TO RELATED APPLICATIONS

The present application claims priority from Japanese Patent Application No. 2014-222493, filed on Oct. 31, 2014, the entire contents of which are hereby incorporated by reference.

BACKGROUND

1. Technical Field

The present invention relates to a travel control apparatus for a vehicle, which performs automatic driving control by recognizing a travel environment and detecting travel information relating to a vehicle equipped with the apparatus.

2. Related Art

Recently, various apparatuses employing automatic driving techniques that enable a driver to drive a vehicle in increased comfort and more safely have been developed and proposed. Japanese Unexamined Patent Application Publication No. 2003-63373, for example, discloses a technique employed in an automatic evacuation apparatus for a vehicle to stop the vehicle in a predetermined evacuation region when a fault occurs in a steering system, by controlling a brake force applied to left and right vehicle wheels in order to modify a path of the vehicle.

A case in which an environment recognition function fails or stops during automatic driving and a driver does not immediately perform a backup operation may be envisaged as one situation in which automatic evacuation such as that disclosed in Japanese Unexamined Patent Application Publication No. 2003-63373 is required. Under these conditions, the reliability of information relating to a most recently recognized environment decreases gradually over time, and with less reliable environment information it is difficult to complete an automatic evacuation operation such that the vehicle is parked on a road shoulder even using the automatic evacuation apparatus disclosed in Japanese Unexamined Patent Application Publication No. 2003-63373. As a result, the evacuation operation cannot be performed sufficiently safely.

SUMMARY OF THE INVENTION

It is desirable to provide a travel control apparatus for a vehicle, with which the vehicle can be automatically evacuated to a road shoulder safely and reliably without contacting an obstruction such as a guardrail when an environment recognition function fails during automatic driving.

An aspect of the present invention provides a travel control apparatus for a vehicle having a travel environment information acquisition unit that acquires travel environment information relating to a travel environment in which the vehicle travels, and a travel information detector that detects travel information relating to the vehicle, whereby the travel control apparatus executes automatic driving control on the basis of the travel environment information and the travel information relating to the vehicle. The travel control apparatus includes: a vehicle peripheral object detector that detects an object on a periphery of the vehicle, separately to the travel environment information acquisition unit; an environment information acquisition failure detector that detects a acquisition failure in the travel environment information acquisition unit; and an evacuation controller that executes evacuation control, when an acquisition failure of the travel environment information is detected, by setting a travel path on which to evacuate the vehicle to a roadside as a target travel path on the basis of the travel environment information detected most recently before the acquisition failure of the travel environment information and the travel information and then evacuating the vehicle to the roadside through automatic driving, and that activates the vehicle peripheral object detector and, when the vehicle peripheral object detector detects an object on the periphery of the vehicle, executes the evacuation control on the basis of information relating to the object on the periphery of the vehicle, the travel information, and the travel environment information detected most recently before the acquisition failure of the travel environment information.

DETAILED DESCRIPTION

An implementation of the present invention will be described below on the basis of the drawings.

Figure 1:
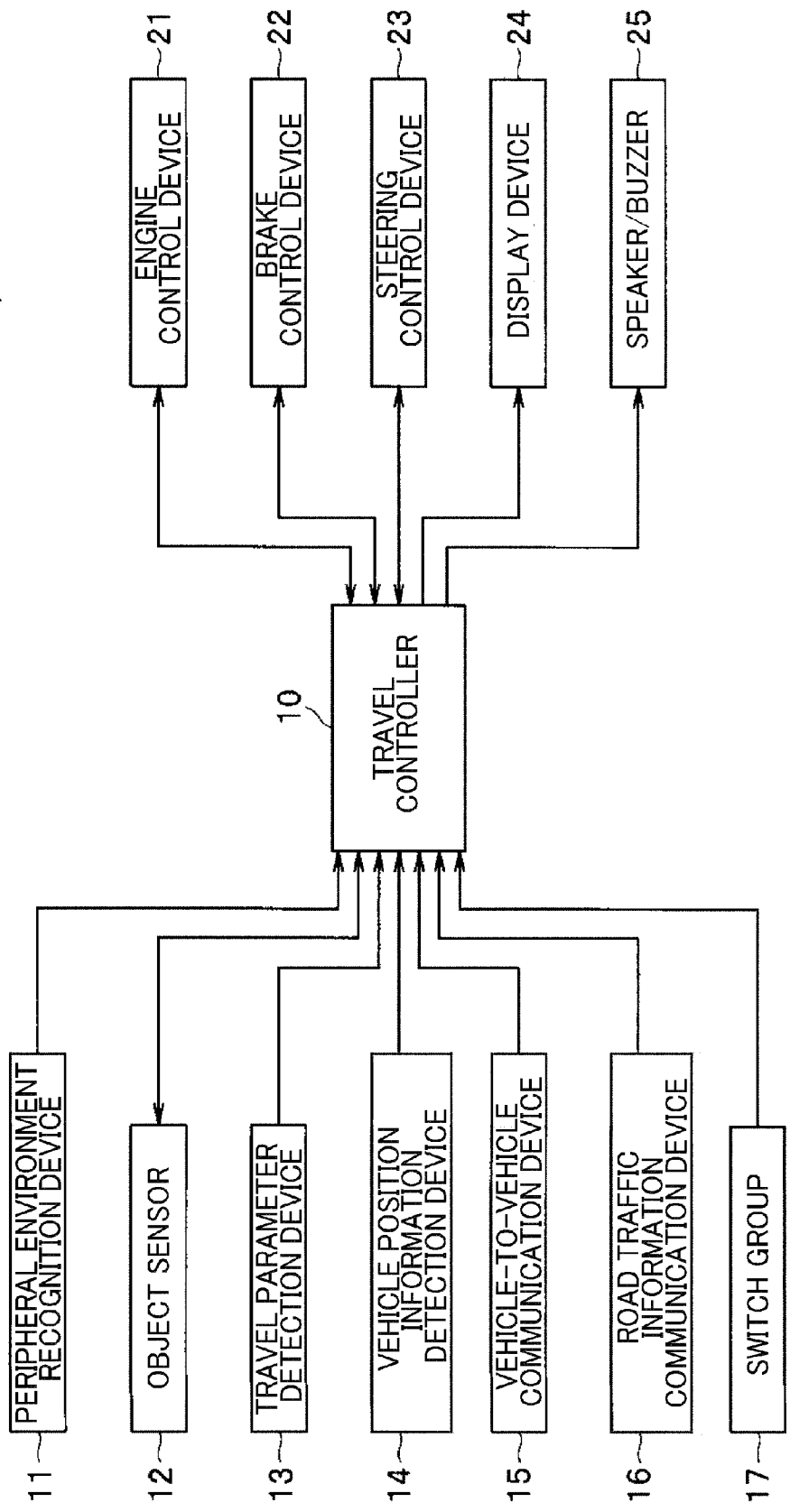
FIG. 1 is an overall view illustrating a configuration of a travel control apparatus for a vehicle according to an implementation of the present invention.

In FIG. 1, a reference numeral 1 denotes a travel control apparatus for a vehicle. In the travel control apparatus 1, input devices including a peripheral environment recognition device 11, an object sensor 12, a travel parameter detection device 13, a vehicle position information detection device 14, a vehicle-to-vehicle communication device 15, a road traffic information communication device 16, and a switch group 17, and output apparatuses including an engine control device 21, a brake control device 22, a steering control device 23, a display device 24, and a speaker/buzzer 25 are connected to a travel controller 10.

The peripheral environment recognition device 11 is constituted by a camera device (a stereo camera, a monocular camera, a color camera, or the like; not illustrated) that includes a solid state imaging device or the like and is provided in a vehicle cabin of a vehicle equipped with travel control apparatus 1 (hereinafter referred to as "the vehicle") in order to obtain image information by photographing an external environment of the vehicle, and a radar device (a laser radar, a millimeter wave radar, or the like; not illustrated) that receives reflection waves from three-dimensional objects existing on the periphery of the vehicle.

The peripheral environment recognition device 11 performs known grouping processing, for example, in relation to distance information on the basis of the image information photographed by the camera device, and by comparing the grouped distance information with preset three-dimensional road shape data, three-dimensional object data, and so on, extracts positions (distances and angles), as well as speeds, of lane division line data, side wall data indicating guardrails, curbstones, and the like existing alongside a road, three-dimensional object data indicating vehicles and the like, and so on relative to a vehicle.

The peripheral environment recognition device 11 also detects positions (distances and angles), as well as speeds, of three-dimensional objects from which reflection waves are received on the basis of reflection wave information obtained by the radar apparatus. In one implementation, the peripheral environment recognition device 11 may be provided as a travel environment information acquisition unit.

Further, when a failure occurs in the camera device, the radar device, and so on of the peripheral environment recognition device 11 or the precision with which the peripheral environment is recognized deteriorates due to adverse weather or the like, for example, the failure in the peripheral environment recognition device 11 is output to the travel controller 10. In one implementation, the peripheral environment recognition device 11 may also function as an environment information acquisition failure detector.

Figure 3:
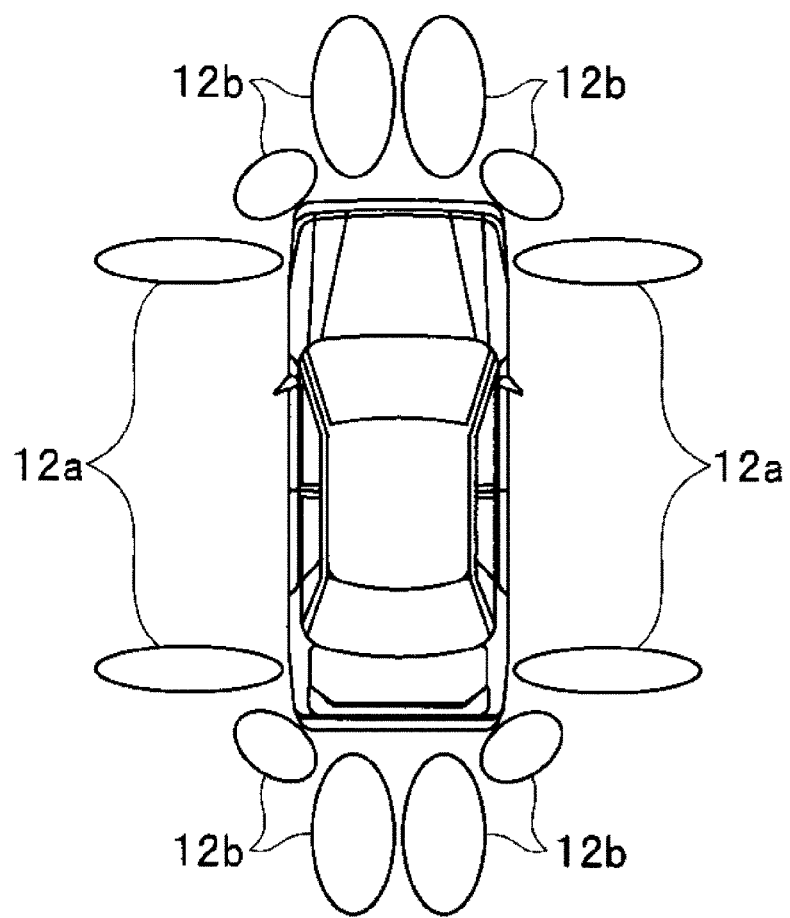
FIG. 3 is an illustrative view of an object sensor according to the implementation of the present invention.

As illustrated in FIG. 3, the object sensor 12 is constituted by a side sensor 12a and an approach sensor 12b. An ultrasonic sensor or an infrared sensor, for example, is used as the object sensor 12. The side sensor 12a detects objects on the side of the vehicle, while the approach sensor 12b detects objects approaching the vehicle. The object sensor 12, in contrast to the peripheral environment recognition device 11 described above, detects the presence of an object, a distance to the object, and a direction of the object during so-called parking assistance control and so on. In one implementation, the object sensor 12 is may be provided as a vehicle peripheral object detector.

The travel parameter detection device 13 detects travel information relating to the vehicle, more specifically a vehicle speed, a steering wheel angle, a yaw rate, an accelerator opening, a throttle opening, a road surface gradient of a travel road surface, an estimated road surface friction coefficient value, and so on. In one implementation, the travel parameter detection device 13 may be provided as a travel information detector.

The vehicle position information detection device 14 is a conventional navigation system, for example, which receives radio waves emitted by a global positioning system (GPS) satellite, for example, detects a current position on the basis of the radio wave information, and specifies the vehicle position on map data stored in advance on a flash memory, a compact disc (CD), a digital versatile disc (DVD), a Blu-ray (registered trademark) disc, a hard disk drive (HDD), or the like.

The pre-stored map data include road data and facility data. The road data include link position information, link type information, node position information, node type information, information indicating connection relationships between the nodes and the links, or in other words information indicating branching (see FIG. 7A) and merging (see FIG. 7B) locations on the road, information indicating a maximum vehicle speed on branch roads, and so on. Note that in this implementation, a guidance route set by the navigation system is used to determine the lane of the branch road in which the vehicle is to travel. The facility data include a plurality of records relating to respective facilities, and each record includes data corresponding to information indicating a name, a position, and a type (a department store, a store, a restaurant, a parking lot, a park, a location for repairing broken-down vehicles) of a facility. When an operator inputs a destination while the vehicle position is displayed in a map position, a route from a starting location to the destination is calculated in a predetermined manner, and then displayed on the display device 24, which is constituted by a display or a monitor, and output as voice guidance from the speaker/buzzer 25, so that the operator can be guided to the destination. In one implementation, the vehicle position information detection device 14 may be provided as the travel environment information acquisition unit.

The vehicle-to-vehicle communication device 15 is constituted by a short range wireless communication device having a communication area of approximately 100 [m], such as a wireless LAN, for example, and is capable of communicating directly with another vehicle without passing through a server or the like so as to exchange information with the other vehicle. Through mutual communication with the other vehicle, the vehicle-to-vehicle communication device 15 exchanges vehicle information, travel information, traffic environment information, and so on. The vehicle information includes unique information indicating a vehicle type (in this implementation, a passenger vehicle, a truck, a motorcycle, and so on). Further, the travel information includes vehicle speed and vehicle position information, information indicating whether or not a brake lamp is illuminated, information indicating whether or not a direction indicator used to indicate a right or left turn is flashing, and information indicating whether or not a hazard lamp used during an emergency stop is flashing. Furthermore, the traffic environment information includes information that varies in accordance with the condition of road congestion information, construction work information, and so on. In one implementation, the vehicle-to-vehicle communication device 15 may be provided as the travel environment information acquisition unit.

The road traffic information communication device 16 receives road traffic information relating to congestion, accidents, construction work, required times, and parking lots in real time from an FM multiplex broadcast or a transmitter disposed on the road using a so-called Vehicle Information and Communication System (VICS; registered trademark), and displays the received traffic information on the pre-stored map data described above. In one implementation, the road traffic information communication device 16 may be provided as the travel environment information acquisition unit.

The switch group 17 is a group of switches relating to control for assisting driving by a driver, and is constituted by, for example, a switch for executing travel control at a preset fixed speed or a switch for executing following control to maintain an inter-vehicle distance and an inter-vehicle time to a preceding vehicle at preset fixed values, a switch for executing lane keep control, which is travel control for staying in a set travel lane, a switch for executing lane deviation prevention control to prevent deviation from the travel lane, a switch for permitting execution of overtaking control in order to overtake a preceding vehicle (an overtaking target vehicle), a switch for executing automatic driving control, in which all of these control operations are performed in a coordinated fashion, a switch for setting the vehicle speed, inter-vehicle distance, inter-vehicle time, speed limit, and so on required in the respective control operations, a switch for canceling the respective control operations, and so on.

The engine control device 21 is a conventional control unit that performs main control such as fuel injection control, ignition timing control, control of an electronically controlled throttle valve, and the like on an engine (not illustrated) of the vehicle on the basis of an intake air amount, the throttle opening, an engine water temperature, an intake air temperature, an oxygen concentration, a crank angle, the accelerator opening, and other vehicle information, for example.

The brake control device 22 is capable of controlling brake devices (not illustrated) of four wheels independently of brake operations performed by the driver on the basis of the brake switch, wheel speeds of the four wheels, the steering wheel angle, the yaw rate, and other vehicle information, for example, and corresponds to a conventional antilock brake system and a conventional control unit that performs yaw brake control such as antiskid control by applying a yaw moment to the vehicle. When a target deceleration $(d^2X/dt^2)$ t and brake forces of the respective wheels are input from the travel controller 10, the brake control device 22 calculates brake fluid pressures of the respective wheels on the basis of the target deceleration $(d^2X/dt^2)$ t and the brake forces of the respective wheels, and operates a brake driver (not illustrated).

The steering control device 23 is a conventional control device that controls an assist torque generated by an electric power steering motor (not illustrated) provided in a steering system of the vehicle on the basis of the vehicle speed, the steering torque, the steering wheel angle, the yaw rate, and other vehicle information, for example. The steering control device 23 is also capable of lane keep control for controlling travel so that the vehicle stays in the set travel lane, lane deviation prevention control for preventing the vehicle from deviating from the travel lane, and automatic driving steering control in which the lane keep control and lane deviation prevention control are executed in a coordinated fashion. Accordingly, when a steering angle, a target steering wheel angle θHt, or a steering torque required for the lane keep control, the lane deviation prevention control, and the automatic driving steering control is calculated by the travel controller 10 and input into the steering control device 23, the steering control device 23 drive-controls the electric power steering motor in accordance with the input control amount.

The display device 24 is a device for providing the driver with visual warnings and notifications, such as a monitor, a display, or an alarm lamp, for example. Further, the speaker/buzzer 25 is a device for providing the driver with aural warnings and notifications.

On the basis of input signals from the respective devices 11 to 17 described above, the travel controller 10 executes automatic driving control and so on by implementing collision prevention control for preventing a collision with an obstruction or the like, constant speed travel control, following travel control, lane keep control, lane deviation prevention control, overtaking control, and so on in a coordinated fashion. Here, when a acquisition failure of the travel environment information is detected and the driver does not perform a driving operation, the travel controller 10 executes evacuation control by setting a travel path on which to evacuate the vehicle to a roadside as a target travel path on the basis of the travel environment information detected most recently before the acquisition failure of the travel environment information and the travel information and, and then evacuating the vehicle to the roadside through automatic driving. Further, the travel controller 10 activates the object sensor 12, and when an object is detected on the periphery of the vehicle by the object sensor 12, the travel controller 10 executes the evacuation control on the basis of information from the object sensor 12, the travel environment information detected most recently before the acquisition failure of the travel environment information, and the travel information. In one implementation, the travel controller 10 may function as an evacuation controller.

Figure 2:
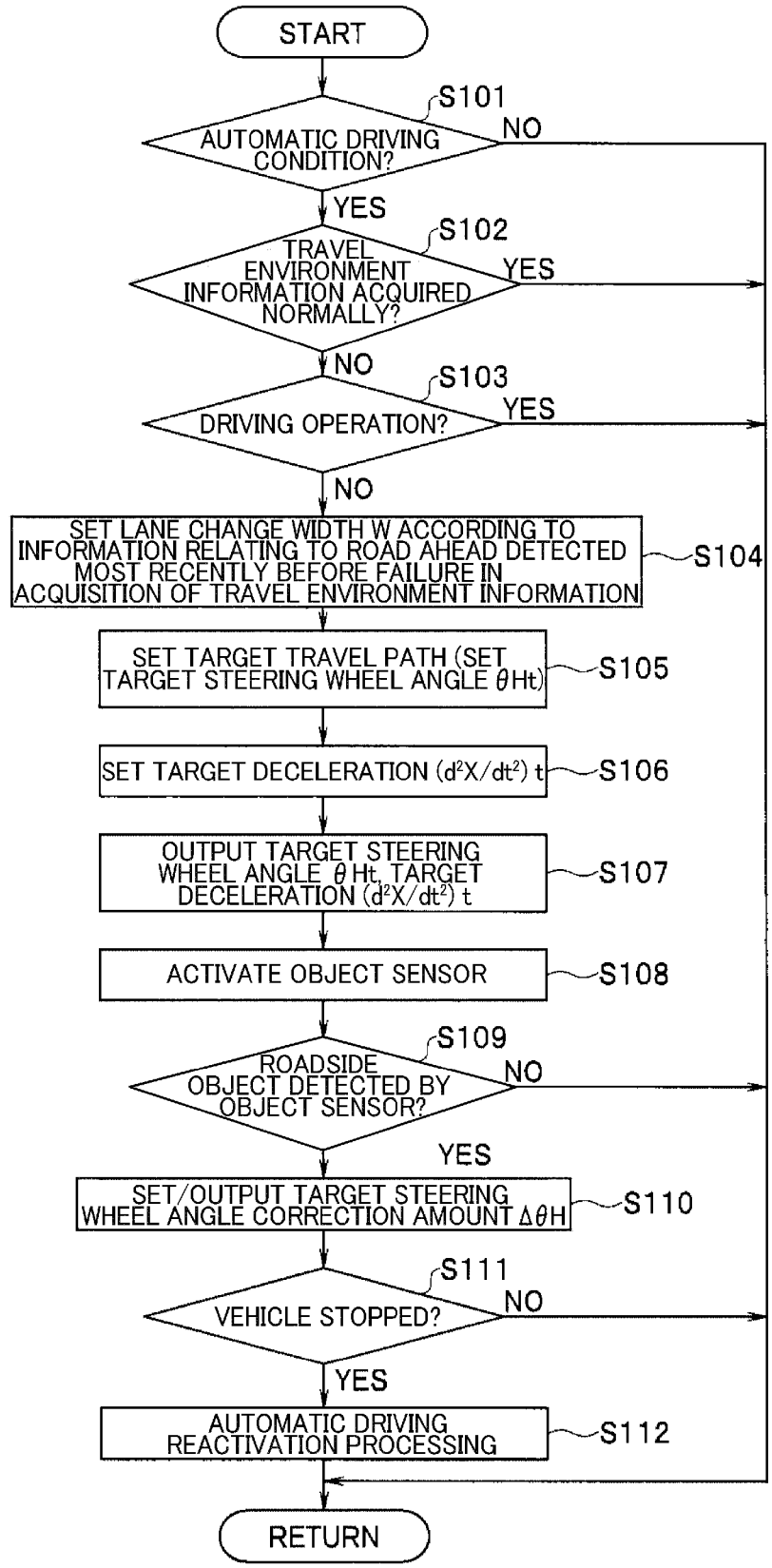
FIG. 2 is a flowchart of an automatic evacuation control program according to the implementation of the present invention.

Next, the automatic evacuation control executed by the travel controller 10 will be described using a flowchart illustrated in FIG. 2.

First, in step (abbreviated to "S" hereafter) 101, a determination is made as to whether or not an automatic driving condition is established, i.e. whether or not the automatic driving control is underway. When the automatic driving condition is not established, the program is terminated, and when the automatic driving condition is established, the routine advances to S102.

In S102, a determination is made as to whether or not the travel environment information required for automatic driving has been acquired normally. When it is determined that the travel environment information has been acquired normally, the program is terminated, and when it is determined that a failure (a breakdown or a reduction in reliability with respect to image recognition, deterioration of a radar wave transmission/reception function, or the like, for example) has occurred in relation to acquisition of the travel environment information, the routine advances to S103.

In S103, a determination is made as to whether or not the driver has performed a driving operation such as inputting a steering torque of at least a predetermined value, inputting a turning speed of at least a predetermined value, depressing a brake pedal, depressing an accelerator pedal, and so on, for example. When it is determined as a result of the determination that the driver has performed a driving operation, a backup operation is determined to have been performed by the driver in response to the acquisition failure of the travel environment information, and the program is terminated. When the driver has not performed a driving operation, the routine advances to S104 in order to execute the automatic evacuation control.

Figure 4:
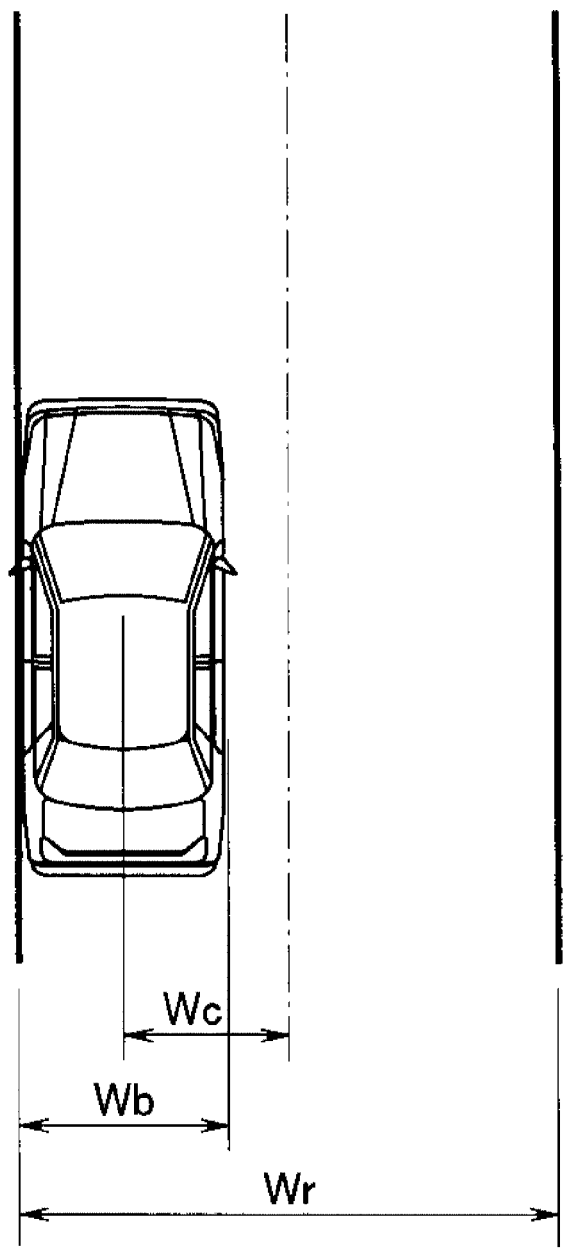
FIG. 4 is an illustrative view of a correction value Wc used to correct a lane change width W according to the implementation of the present invention.

In S104, a lane change width W is set in accordance with information relating to the road ahead detected most recently before the acquisition failure of the travel environment information. More specifically, as illustrated in FIG. 4, a position of the vehicle when a left side surface of the vehicle is substantially aligned with the side of the road is calculated as a correction amount Wc of the lane change width W using Equation (1), illustrated below.

$$Wc=(Wr-Wb)/2 \qquad (1)$$

Here, Wr is a road width, and Wb is a vehicle body width.

Figure 7A:
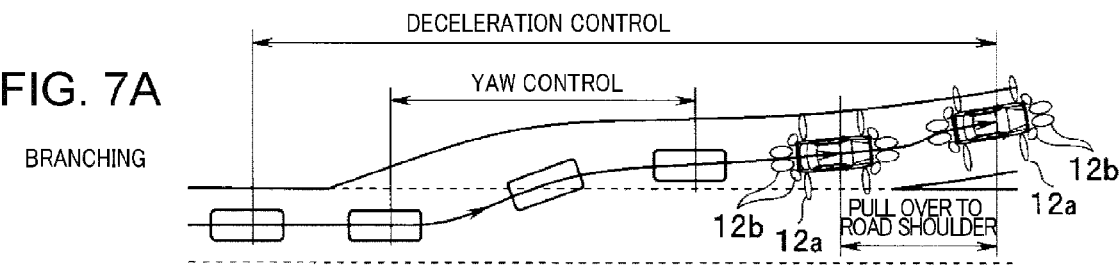
FIG. 7A is an illustrative view of a case in which automatic evacuation is performed on a branch road.

When the road ahead is a branch road, as illustrated in FIG. 7A, the lane change width W is calculated using Equation (2) illustrated below, for example, so that the vehicle can be evacuated onto the road shoulder of the branch road.

$$W=W+Wc \qquad (2)$$

Figure 7B:
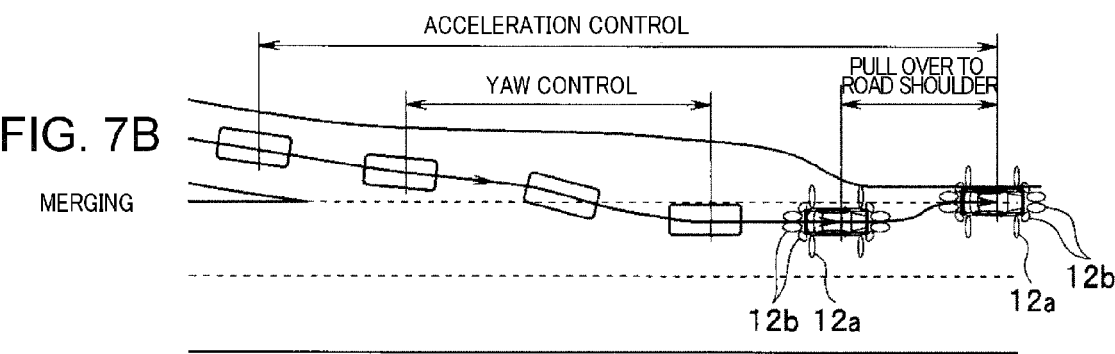
FIG. 7B is an illustrative view of a case in which automatic evacuation is performed on a merging road.

Further, when the road ahead is a merging road, as illustrated in FIG. 7B, the lane change width W is calculated using Equation (3) illustrated below, for example, so that the vehicle can be evacuated onto the road shoulder of the branch road.

$$W=W-Wc \qquad (3)$$

Figure 7C:
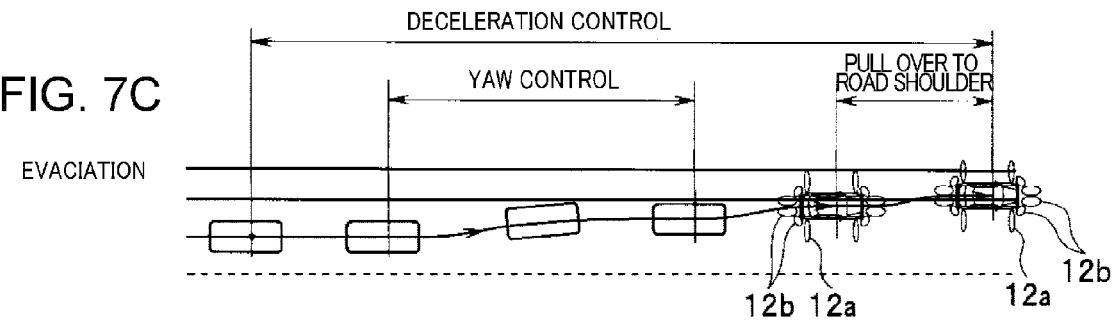
FIG. 7C is an illustrative view of a case in which automatic evacuation is performed onto a road shoulder of a straight road.

Furthermore, when the road ahead is another type of straight road or the like, as illustrated in FIG. 7C, the lane change width W is calculated using Equation (4) illustrated below, for example, so that the vehicle can be evacuated onto the road shoulder of the other type of straight road or the like.

$$W=Wc \qquad (4)$$

Note that in the above examples, the lane change width W is set using a left-hand lane as an example, but the lane change width W may be set similarly in relation to a right-hand lane by switching left for right and vice versa.

After the lane change width W is set in S104, the routine advances to S105, where the target travel path (the target steering wheel angle θHt) of the automatic evacuation operation is set.

A lane change performed by the vehicle and steering control (setting of the target steering wheel angle θHt) accompanying the lane change will be described below.

A vehicle trajectory of the vehicle during a lane change is assumed to be determined from a normalization polynomial of a minimum jerk ($\int d^3y/dx^3$) trajectory on a two-dimensional coordinate system on which a travel distance is set as an x direction and a lateral movement amount (the lane change width) is set as a y direction, for example.

In this case, assuming that y(0)=0, y(1)=1, dy(0)/dx=$d^2y$(0)/$dx^2$=0, dy(1)/dx=$d^2y$(1)/$dx^2$=0, Equation (5), illustrated below, is obtained.

$$y=6\times x^5-15\times x^4+10\times x^3 \qquad (5)$$

By implementing differential processing on Equation (5), Equations (6), (7), (8), illustrated below, are obtained.

$$dy/dx=30\times(x^4-2\times x^3+x^2) \qquad (6)$$

$$d^2y/dx^2=60\times(2\times x^3-3\times x^2+x) \qquad (7)$$

$$d^3y/dx^3=60\times(6\times x^2-6\times x+1) \qquad (8)$$

When x is back-calculated at $d^3y/dx^3$=0 using Equation (8), Equation (9), illustrated below, is obtained.

$$x(d^3y/dx^3=0)=(3\pm 3^{1/2})/6 \qquad (9)$$

When $d^2y/dx^2$ is calculated from this value of x using Equation (7), and a resulting normalized curvature value is set as an absolute value $|(d^2y/dx^2)max|$ of a maximum value of a lateral acceleration, a value of Equation (10), illustrated below, is obtained.

$$|(d^2y/dx^2)max|=10\times 3^{1/2}/3\approx 5.77 \qquad (10)$$

Further, when a maximum lateral acceleration ($d^2Y/dt^2$) max_c during the lane change (a preset value) is expressed using the maximum value ($d^2y/dx^2$) max of the lateral acceleration described above, Equation (11) illustrated below, in which the travel distance required for the lane change is set as Ly and the lane change width is set as W, is obtained.

$$(d^2y/dx^2)max\times W/(Ly/V)^2=(d^2Y/dt^2)max\_c \qquad (11)$$

When Equation (11) is solved in relation to the travel distance Ly, Equation (12), illustrated below, is obtained.

$$Ly=(5.77\times W\times V^2/(d^2Y/dt^2)max\_c)^{1/2} \qquad (12)$$

Further, when an estimated normalized travel distance of the vehicle in the x direction is set as xe, Equation (13) is obtained.

$$xe=(\int V\times dt)/Ly \qquad (13)$$

A relationship between a target yaw rate γt, a vehicle speed V, and the lateral acceleration ($d^2y/dx^2$) is expressed by Equation (14), illustrated below, and therefore the target yaw rate γt can be expressed by Equation (15), illustrated below, using Equation (7).

$$\gamma t\times V=(d^2y/dx^2)\times W/(Ly/V)^2 \qquad (14)$$

$$\gamma t=60\times(2\times xe^3-3\times xe^2+xe)\times W\times V/Ly^2 \qquad (15)$$

By inserting the target yaw rate γt into a relational expression (Equation (16)) of the target steering wheel angle θHt, illustrated below, the target steering wheel angle θHt required for the control (i.e. to be output to the steering control device 23) is determined.

$$\theta Ht=\gamma t\times n/G\gamma \qquad (16)$$

Here, n is a steering gear ratio, and Gγ is a yaw rate gain. The yaw rate gain Gγ can be calculated using Equation (17), illustrated below, for example.

$$G\gamma=(1/(1+A\times V^2))\times(V/l) \qquad (17)$$

Here, l is a wheel base, and A is a unique stability factor of the vehicle, which is calculated using Equation (18), illustrated below.

$$A=-(m/(2\times l^2))\times(lf\times Kf-lr\times Kr)/(Kf\times Kr) \qquad (18)$$

Here, Kf is a cornering power of a front wheel, Kr is a cornering power of a rear wheel, lf is a distance between the front wheel and the center of gravity, and lr is a distance between the rear wheel and the center of gravity.

In other words, in S105, steering control is performed by outputting the target steering wheel angle θHt calculated in Equation (16) to the steering control device 23 when the vehicle reaches a lane change control start point, which is defined by the travel distance Ly required for the lane change, the travel distance Ly having been calculated using Equation (12), in a lane change position on the branch road, merging road, straight road, or other road based on the guidance route set on the map information by the navigation system.

Figure 5:
FIG. 5 is an illustrative view illustrating an example of a characteristic of a set target deceleration according to the implementation of the present invention.

After the target steering wheel angle θHt is calculated and set in S105, the routine advances to S106, where a target deceleration ($d^2X/dt^2$) t is set on the basis of a visibility limit included in the travel environment information detected most recently before the acquisition failure of the travel environment information by referring to a map of the target deceleration ($d^2X/dt^2$) t such as that illustrated in FIG. 5, for example, which is set in advance by experiments, calculations, and so on. On the map of the target deceleration ($d^2X/dt^2$) t illustrated in FIG. 5, the target deceleration ($d^2X/dt^2$) t is set on the basis of the most recently acquired visibility limit information so as to be steadily higher as the vehicle travels. In other words, when an acquisition failure of the travel environment information occurs, the vehicle is decelerated at a steadily higher deceleration in accordance with the continuous travel distance so that the vehicle is stopped in the evacuation position (the road shoulder). As a result, safety is secured in the vehicle reliably. Note that when the distance from the visibility limit is great, the target deceleration ($d^2X/dt^2$) t is set at zero, thereby avoiding a situation in which the lane change is impaired by deceleration.

Next, the routine advances to S107, where the target steering wheel angle θHt set in S105 is output to the steering control device 23 in order to execute automatic steering control and the target deceleration ($d^2X/dt^2$) t set in S106 is output to the brake control device 22 in order to execute automatic deceleration control.

Next, the routine advances to S108, where the object sensor 12 is activated, and then advances to S109, where a determination is made as to whether or not a roadside object has been detected by the object sensor 12.

When it is determined as a result of the determination of S109 that a roadside object has not been detected by the object sensor 12, the program is terminated as is, whereupon the evacuation control is continued on the basis of the target steering wheel angle θHt and the target deceleration ($d^2X/dt^2$) t.

When it is determined as a result of the determination of S109 that a roadside object has been detected by the object sensor 12, on the other hand, the routine advances to S110.

Figure 6:
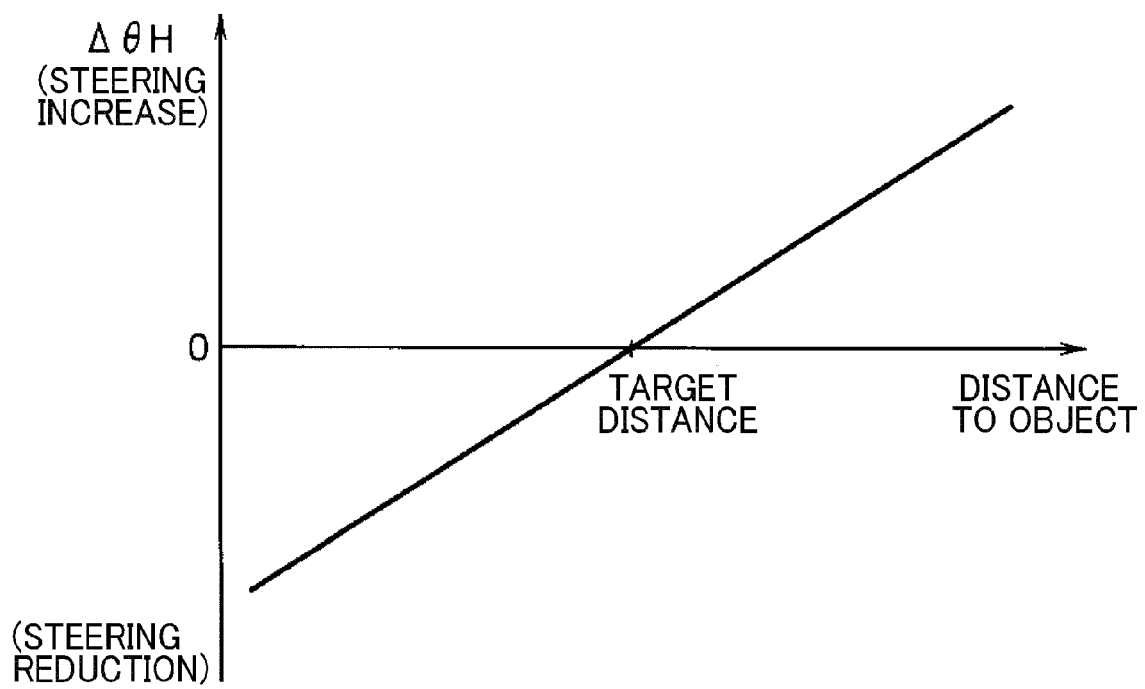
FIG. 6 is an illustrative view illustrating an example of a correction amount applied to a target steering wheel angle set in accordance with a distance to an object, according to the implementation of the present invention.

In S110, the routine shifts to control for pulling over to the road shoulder, as illustrated in FIGS. 7A, 7B, and 7C. In this control, a correction amount ΔθH of the target steering wheel angle θHt is set by referring to a map such as that illustrated in FIG. 6, for example, which is set in advance on the basis of experiments, calculations, and so on and used to stop the vehicle in a position where the side surface of the vehicle is removed from the roadside object by a target distance. The correction amount ΔθH is then output to the steering control device 23 in order to execute the automatic steering control.

The steering control device 23 implements a steering increase correction by performing control to add the correction amount ΔθH of the target steering wheel angle θHt to the target steering wheel angle θHt, with the result that the vehicle approaches the roadside object. Alternatively, the steering control device 23 implements a steering reduction correction by performing control to subtract the correction amount ΔθH of the target steering wheel angle θHt from the target steering wheel angle θHt, with the result that the vehicle moves away from the roadside object. These operations are repeated so that the vehicle eventually stops precisely at the target distance from the roadside object. Note that in a case where the detected distance to the object is abnormally large for some reason, the correction amount ΔθH of the target steering wheel angle θHt may be set at zero.

Following S110, the routine advances to S111, where a determination is made as to whether or not the vehicle has been stopped by the evacuation control. When the vehicle has not stopped, the program is terminated, and when the vehicle has stopped, the routine advances to S112, where the automatic driving control is reactivated, after which the program is terminated. When the automatic driving control is reactivated, the acquisition failure of the travel environment information may have been eliminated, and when the acquisition failure has been eliminated, automatic driving can be resumed. Even if the acquisition failure has not been eliminated, the automatic evacuation control can be performed to evacuate the vehicle to an even safer location. The automatic driving control may be reactivated after a set time, or may be reactivated a set number of times.

According to this implementation of the present invention, the travel controller 10 executes the automatic driving control, and when an acquisition failure of the travel environment information is detected and the driver does not perform a driving operation, the travel controller 10 executes the evacuation control by setting a travel path on which to evacuate the vehicle to the roadside as the target travel path on the basis of the travel information and the travel environment information detected most recently before the acquisition failure of the travel environment information, and then evacuating the vehicle to the roadside through automatic driving. Further, the travel controller 10 activates the object sensor 12, and when the object sensor 12 detects an object on the periphery of the vehicle, the travel controller 10 executes the evacuation control on the basis of the information from the object sensor 12, the travel environment information detected most recently before the acquisition failure of the travel environment information, and the travel information. As a result, the vehicle can be automatically evacuated to the road shoulder safely and reliably without contacting an obstruction such as a guardrail when an environment recognition function fails during automatic driving.

The invention claimed is:

1. A travel control apparatus for a vehicle, the travel control apparatus executing automatic driving control on the basis of travel environment information and travel information relating to the vehicle, the travel control apparatus comprising:
    a travel environment information acquisition unit configured to acquire the travel environment information relating to the travel environment in which the vehicle travels;
    a travel information detector configured to detect the travel information relating to the vehicle;
    a vehicle peripheral object detector configured to detect an object on a periphery of the vehicle, the vehicle peripheral object detector being provided separately from the travel environment information acquisition unit;
    an environment information acquisition failure detector configured to detect an acquisition failure in the travel environment information acquisition unit; and
    an evacuation controller configured to:
        execute evacuation control, when an acquisition failure of the travel environment information is detected, by setting a first travel path on which to evacuate the vehicle to a roadside as a target travel path on the basis of the travel information and the travel environment information detected most recently before the acquisition failure of the travel environment information,
        after setting the target travel path, activate the vehicle peripheral object detector,
        when the vehicle peripheral object detector detects the object on the periphery of the vehicle, execute the evacuation control by setting a second travel path as the target travel path on the basis of information relating to the object on the periphery of the vehicle, the travel information, and the travel environment information detected most recently before the acquisition failure of the travel environment information, and when the vehicle peripheral object detector detects no object on the periphery of the vehicle, continue to execute the evacuation control based on the first travel path as the target travel path, and evacuate the vehicle to the roadside through automatic driving on the basis of the target travel path.

2. The travel control apparatus for a vehicle according to claim 1, wherein the evacuation controller cancels the evacuation control when a driver performs a driving operation.

3. The travel control apparatus for a vehicle according to claim 2, wherein the evacuation control executed by the evacuation controller involves deceleration control performed by setting a target deceleration in accordance with a travel distance of the vehicle and a visibility limit included in the travel environment information detected most recently before the acquisition failure of the travel environment information.

4. The travel control apparatus for a vehicle according to claim 3, wherein, when the vehicle stops as a result of the deceleration control performed during the evacuation control executed by the evacuation controller and when the acquisition failure has eliminated, the travel control apparatus resumes the automatic driving.

5. The travel control apparatus for a vehicle according to claim 4, wherein, when the vehicle peripheral object detector detects the object on the periphery of the vehicle, the evacuation controller is further configured to control steering for maintaining a predetermined distance between the detected object on the periphery of the vehicle and the vehicle.

6. The travel control apparatus for a vehicle according to claim 3, wherein, when the vehicle peripheral object detector detects the object on the periphery of the vehicle, the evacuation controller is further configured to control steering for maintaining a predetermined distance between the detected object on the periphery of the vehicle and the vehicle.

7. The travel control apparatus for a vehicle according to claim 2, wherein, when the vehicle peripheral object detector detects the object on the periphery of the vehicle, the evacuation controller is further configured to control steering for maintaining a predetermined distance between the detected object on the periphery of the vehicle and the vehicle.

8. The travel control apparatus for a vehicle according to claim 1, wherein the evacuation control executed by the evacuation controller involves deceleration control performed by setting a target deceleration in accordance with a travel distance of the vehicle and a visibility limit included in the travel environment information detected most recently before the acquisition failure of the travel environment information.

9. The travel control apparatus for a vehicle according to claim 8, wherein, when the vehicle stops as a result of the deceleration control performed during the evacuation control executed by the evacuation controller and when the acquisition failure has eliminated, the travel control apparatus resumes the automatic driving.

10. The travel control apparatus for a vehicle according to claim 9, wherein, when the vehicle peripheral object detector detects the object on the periphery of the vehicle, the evacuation controller is further configured to control steering for maintaining a predetermined distance between the detected object on the periphery of the vehicle and the vehicle.

11. The travel control apparatus for a vehicle according to claim 8, wherein, when the vehicle peripheral object detector detects the object on the periphery of the vehicle, the evacuation controller is further configured to control steering for maintaining a predetermined distance between the detected object on the periphery of the vehicle and the vehicle.

12. The travel control apparatus for a vehicle according to claim 1, wherein, when the vehicle peripheral object detector detects the object on the periphery of the vehicle, the evacuation controller is further configured to control steering for maintaining a predetermined distance between the detected object on the periphery of the vehicle and the vehicle.

13. The travel control apparatus for a vehicle according to claim 1, wherein the travel environment information acquisition unit is a camera or a radar.

14. The travel control apparatus for a vehicle according to claim 1, wherein the vehicle peripheral object detector is an ultrasonic sensor or an infrared sensor.

15. The travel control apparatus for a vehicle according to claim 1, wherein the travel information includes a vehicle speed, a steering wheel angle, a yaw rate, an accelerator opening, a throttle opening, a road surface gradient of a travel road surface, an estimated road surface friction coefficient value.

* * * * *